No. 650,007. Patented May 22, 1900.
C. A. HACKETT.
BICYCLE STAND AND SUPPORT.
(Application filed June 21, 1899.)
(No Model.)
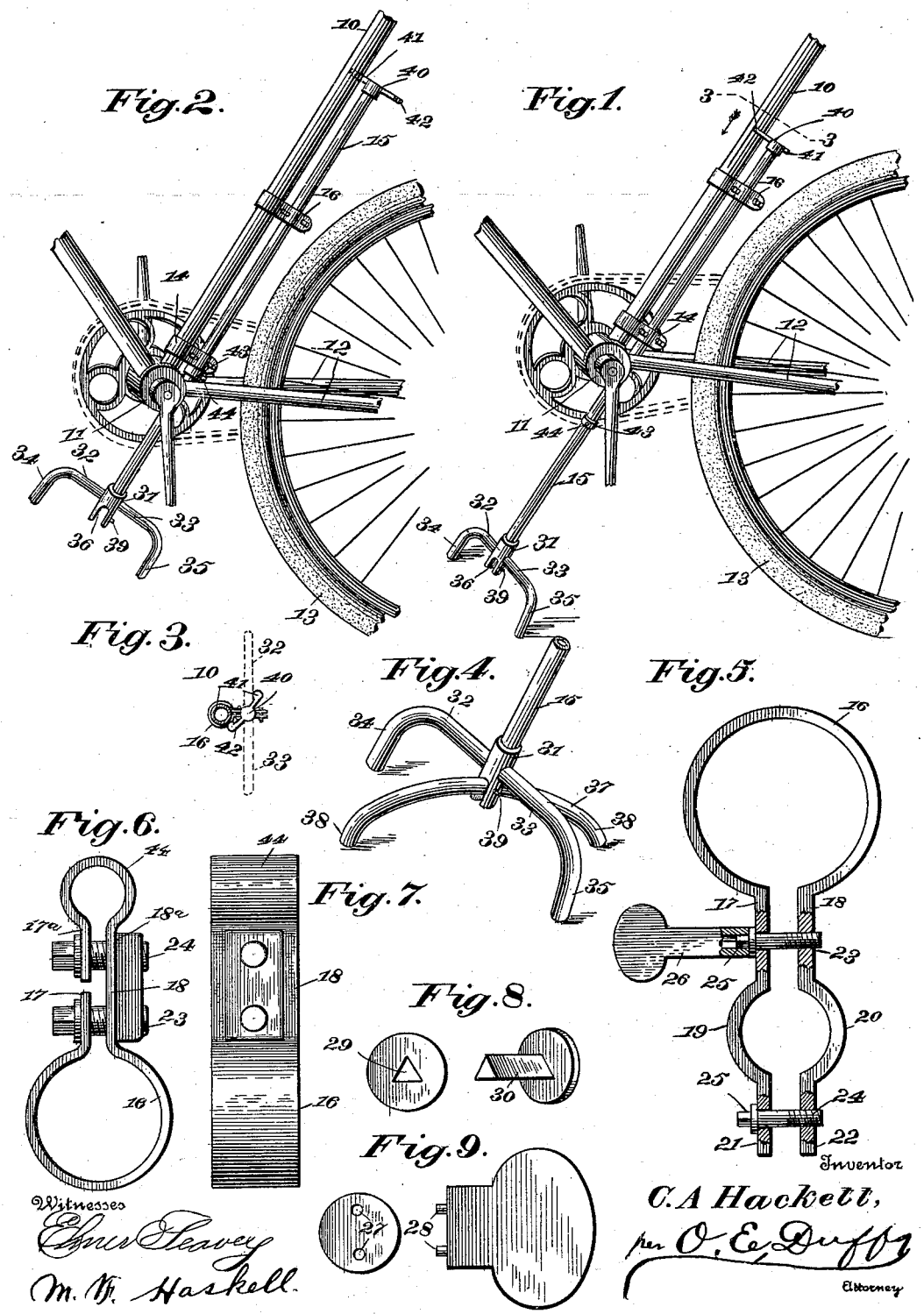

UNITED STATES PATENT OFFICE.

CLARENCE A. HACKETT, OF MASSILLON, OHIO.

BICYCLE STAND AND SUPPORT.

SPECIFICATION forming part of Letters Patent No. 650,007, dated May 22, 1900.

Application filed June 21, 1899. Serial No. 721,363. (No model.)

*To all whom it may concern:*

Be it known that I, CLARENCE A. HACKETT, a citizen of the United States, residing at Massillon, in the county of Stark and State of Ohio, have invented certain new and useful Improvements in Bicycle Stands and Supports, of which the following is a specification.

My invention relates to devices for supporting a bicycle in an upright position, and has for its object to provide an improved device of simple and economic construction whereby a bicycle may be supported upright with the wheels upon the ground or with the wheels raised off the ground.

With this object in view my invention consists in the improved construction, arrangement, and combination of parts hereinafter fully described, and afterward specifically pointed out in the claims.

In the accompanying drawings, Figure 1 is a perspective view of sufficient of a bicycle to illustrate the practical operation of my invention as a simple support therefor, the support being shown lowered into operative position. Fig. 2 is a similar view with the support raised and in its inoperative position. Fig. 3 is a sectional view on the line 3 3 of Fig. 1 looking downward. Fig. 4 is a perspective view of the device arranged as a stand to support the bicycle off the ground, the upper portion being broken away. Fig. 5 is a top plan view of the upper clamp detached, parts being broken away to illustrate the clamp-screws, a key also being shown applied to one of the screws. Figs. 6 and 7 are detail views illustrating a different form of clamp. Figs. 8 and 9 are detail views showing other forms of bolt heads and keys.

Like numerals of reference mark the same parts wherever they occur in the various figures of the drawings.

In illustrating the application of my invention to a bicycle only such parts of the bicycle are shown as are necessary to explain the connection and operation of my device, and while I have illustrated the support in place upon one form of bicycle I desire it to be understood that it may be applied with equal facility to any of the ordinary forms of bicycle now in use, including gentlemen's and ladies' wheels, tandems, triplets, &c., provided only that the wheel be provided with a seat-post or a similarly-located bar of the frame. The wheel (illustrated in part) is provided with such a seat-post tube 10, which carries the crank-hanger 11 at its lower end, from which extend the lower forks or side bars 12 to the hub (not shown) of the rear wheel 13.

On the seat-post tube 10 is secured a lower clamp 14, near the crank-hanger, in which is a socket or bore to receive the main bar or upright 15 of the support, fitting snugly but slidably therein, and at some distance above clamp 14 is secured the upper clamp 16, provided with a socket or seat for the upright 15 and provided with means, to be hereinafter described, whereby the upright may be tightly clamped or permitted to slide, as may be deemed necessary or desirable.

The lower clamp 14 may be of any ordinary construction and secured permanently or removably by any desired or approved mechanism. The upper clamp 16, however, I prefer to construct of the form shown in detail in Fig. 5, in which it consists of a single bar or strip of metal bent into circular form to encompass the seat-post tube and having two parallel adjacent arms 17 18, outwardly-curved portions 19 20, and parallel adjacent arms 21 22. In arms 17 and 21 are smooth holes, and arms 18 and 22 are provided with threaded holes to receive screws 23 and 24, provided with corresponding threads, such screws being provided at one end with a head, as at 25, to receive a socket-wrench 26 or with holes 27 to receive a correspondingly-formed pin-wrench or key 28 or with a triangular or other shaped socket, as at 29, to receive a correspondingly-shaped key 30 or with any other suitable form to require a wrench or key other than the ordinary wrench or screw-driver.

At the lower end of upright 15 is a collar 31 to receive and hold a piece of rod or tubing formed into arms 32 33, extending horizontally and laterally in opposite directions and bent downwardly, as at 34 35, to form legs to rest on the ground when the support is lowered.

The collar 31 is provided with a notch 36, below the opening in which the arms 32 and 33 are secured in the vertical plane of the bicycle-wheels. In this notch a bar 37, bent to form legs 38, is snugly but slidably fitted, and when in position to bring its front and rear ends to the ground will with the legs 34 35 form a four-footed base upon which to support the bicycle in vertical position off the ground. The bar 37 may be secured in position by a set-screw 39.

At the upper end of upright 15 is fitted a cap 40, provided with two radial arms 41 and 42, so located that when the upright 15 is lowered and the legs 34 35 resting on the ground the arm 42 will be in contact with the left side of seat-post tube 10, and when raised the arm 41 will be in contact with the right side of the seat-post tube, the position of the arms 32 and 33 when down being at right angles to the vertical plane of the rear wheel of the bicycle, and when up in the plane of that wheel the arms 41 and 42 serving as handles to turn the support and as stops to prevent too great a rotary movement. Upon the upright 15 below the lower clamp is a collar 43, slidable but securable by set-screw 44, which collar will be set in position to prevent the upright from being raised high enough to prevent arm 32 or 33 from striking the tire of the wheel.

The operation of my invention may be recapitulated as follows: The clamps 14 and 16 being in position on the seat-post tube 10, the upright 15, with the arms 32 and 33 secured to its lower end, is secured in the sockets in the clamps 16 and with the legs 34 and 35 off the ground, as illustrated in Fig. 2, when the wheel may be ridden as usual. Upon stopping where there is nothing handy against which to support the wheel the screw 24 is turned to loosen the upper clamp, which will permit the upright 15 to drop until the legs 34 35 reach the ground, the upright being turned ninety degrees during its drop by handle 41 or 42, when the upright will be again securely clamped by turning screw 24 in the opposite direction and the bicycle will be firmly supported upon the wheels and the legs 34 35 in an upright position, the support being locked in position from which it cannot be changed except by some one possessing a key to turn the screw. Should it be desired to support the bicycle upon a stand for show purposes in a store or exhibition or for the purposes of cleaning or adjusting the parts, the bar 37 will be put in place, as before described and as illustrated in Fig. 2, when the whole device may be raised or lowered at will, as in the case of the support only, as described.

In Figs. 6 and 7 I show a slightly-modified form of clamp in which the bar or strip forming the body of the clamp is bent at 16, as before, the strip beginning at the middle of bar 17, curved at 16 to pass around seat-post tube, and has straight bar 18, curved at 44 to receive upright 15 and run straight at 17ª to near end of 17. The parts 17 and 17ª and 18 are provided with smooth holes to receive screws 23 and 24, which are threaded into a block 18ª, lying against the outside of bar 18.

The whole structure is so simple that it can be made at such a minimum cost as to enable it to be put upon the market at a price to bring it within the reach of all bicycle riders and can be applied and adjusted by any person no matter how unskilled.

While I have described the details of construction specifically, I desire it to be understood that changes and variations therein may be made without departing from the spirit and scope of my invention.

Having thus fully described my invention, what I claim as new, and desire to secure by Letters Patent of the United States, is—

1. In a bicycle-support, the combination of an upright, a collar secured to the lower end thereof having a laterally-extending socket and a notch at right angles to the socket in a vertical plane at right angles to that of the lateral sockets, arms fitted into the lateral sockets and having their outer ends bent downwardly to form lateral legs, and a bar securable in the notch having its ends curved downward to form legs, substantially as described.

2. In a bicycle-support the combination with the seat-post tube, of an upright pivotally secured thereto, lateral legs secured to the lower end of the upright, and radial arms projecting from its upper end on opposite sides of and adapted to contact with the tube to limit the rotary motion of the upright, substantially as described.

3. In a bicycle-support the combination with the seat-post tube, of an upright pivotally secured thereto, lateral leg-arms secured to the lower end of the upright, a cap on its upper end, a collar adjustably secured on the uprights to limit its upward movement, and radial arms at right angles to each other on said cap embracing the uprights and adapted to contact with the seat-post tube to limit its rotary motion, substantially as described.

In testimony whereof I affix my signature in presence of two witnesses.

CLARENCE A. HACKETT.

Witnesses:
SAMEL H. MANGER,
MARY E. HACKETT.